(12) United States Patent
Kwon

(10) Patent No.: US 10,208,841 B2
(45) Date of Patent: Feb. 19, 2019

(54) TRANSMISSION

(71) Applicant: Yoon Gu Kwon, Gyeonggi-do (KR)

(72) Inventor: Yoon Gu Kwon, Gyeonggi-do (KR)

(*) Notice: Subject to any disclaimer, the term of this patent is extended or adjusted under 35 U.S.C. 154(b) by 0 days.

(21) Appl. No.: 15/035,872

(22) PCT Filed: Jan. 20, 2015

(86) PCT No.: PCT/KR2015/000577
§ 371 (c)(1),
(2) Date: May 11, 2016

(87) PCT Pub. No.: WO2016/114436
PCT Pub. Date: Jul. 21, 2016

(65) Prior Publication Data
US 2016/0348771 A1    Dec. 1, 2016

(30) Foreign Application Priority Data

Jan. 12, 2015 (KR) .................. 10-2015-0004052

(51) Int. Cl.
*F16H 21/14* (2006.01)
*F16H 35/02* (2006.01)
(Continued)

(52) U.S. Cl.
CPC ............. *F16H 21/14* (2013.01); *F16H 21/12* (2013.01); *F16H 35/008* (2013.01); *F16H 35/02* (2013.01); *F16H 37/124* (2013.01)

(58) Field of Classification Search
CPC .......... F16H 21/08; F16H 21/10; F16H 21/12; F16H 21/14; F16H 35/008; F16H 35/02;
(Continued)

(56) References Cited

U.S. PATENT DOCUMENTS 3,530,731 A * 9/1970 Fink .................... B30B 15/0023
74/69
4,898,042 A * 2/1990 Parsons ................... F16H 21/12
74/68
(Continued)

FOREIGN PATENT DOCUMENTS

CN         201187563         1/2009
EP         0093305 A1 * 11/1983 ............. F16H 21/14
(Continued)

OTHER PUBLICATIONS

JP 2000074170A Transmission Mechanism and Rotary Piston to Which Its Motion Is Applied (Oshima, Kenichi) Mar. 7, 2000, [database online], [retrieved on Sep. 11, 2018] Retrieved from ProQuest <https://dialog.proquest.com/professional/patents/docview/1375763621/abstract/1652F62E2E9586E2698/2?accountid=161361> (Year: 2000).*
(Continued)

*Primary Examiner* — Victor L MacArthur
*Assistant Examiner* — Joseph Brown
(74) *Attorney, Agent, or Firm* — K&L Gates LLP

(57) ABSTRACT

The transmission member moves in a longitudinal direction of the input member to adjust a line b connecting an input central line (A) to an output central line (B) of the output shaft and a line a connecting a rotating central line (C) of the rotation shaft to the output central line (B) of the output shaft so that the lines a and b have the same length or lengths different from each other, thereby changing the rotational force of the input member to transmit the changed rotational force to the output member or transmitting the rotational force to the output member as it is.

4 Claims, 10 Drawing Sheets

(51) Int. Cl.
*F16H 37/12* (2006.01)
*F16H 35/00* (2006.01)
*F16H 21/12* (2006.01)

(58) Field of Classification Search
CPC ...... F16H 35/18; F16H 37/124; F16H 37/126; F16H 48/12
USPC ....... 74/22 R, 22 A, 50, 63, 67, 68, 69, 650, 74/837, 840, 123, 596
See application file for complete search history.

(56) References Cited

U.S. PATENT DOCUMENTS

| | | | |
|---|---|---|---|
| 6,360,463 B1 * | 3/2002 | Huber | G09F 11/025 40/505 |
| 9,346,645 B2 * | 5/2016 | Kinson | B65H 29/12 |
| 2002/0112522 A1 | 8/2002 | Bornhorst et al. | |

FOREIGN PATENT DOCUMENTS

| | | | | |
|---|---|---|---|---|
| FR | 498853 | | 1/1920 | |
| FR | 573816 | | 6/1924 | |
| FR | 1094243 | | 5/1955 | |
| FR | 2650358 | | 2/1991 | |
| JP | 2000074170 A | * | 3/2000 | |
| JP | 2002036000 | | 2/2002 | |
| JP | 2002257207 | | 9/2002 | |
| JP | 2011195128 | | 10/2011 | |
| JP | 2012141016 | | 7/2012 | |
| KR | 20090116389 | | 11/2009 | |
| KR | 101018779 B1 | * | 3/2011 | ............. F16H 21/12 |

OTHER PUBLICATIONS

Office Action for corresponding Korean patent application No. KR 10-2015-0004052 dated May 9, 2016.
International Search Report for International Application No. PCT/KR2015/000577 dated Sep. 23, 2015.
Extended European Search Report issued in related European Patent Application No. 15878082.5 dated Jan. 17, 2018.
Office Action issued in related Japanese Patent Application No. 2017-555185 dated May 22, 2018.

* cited by examiner

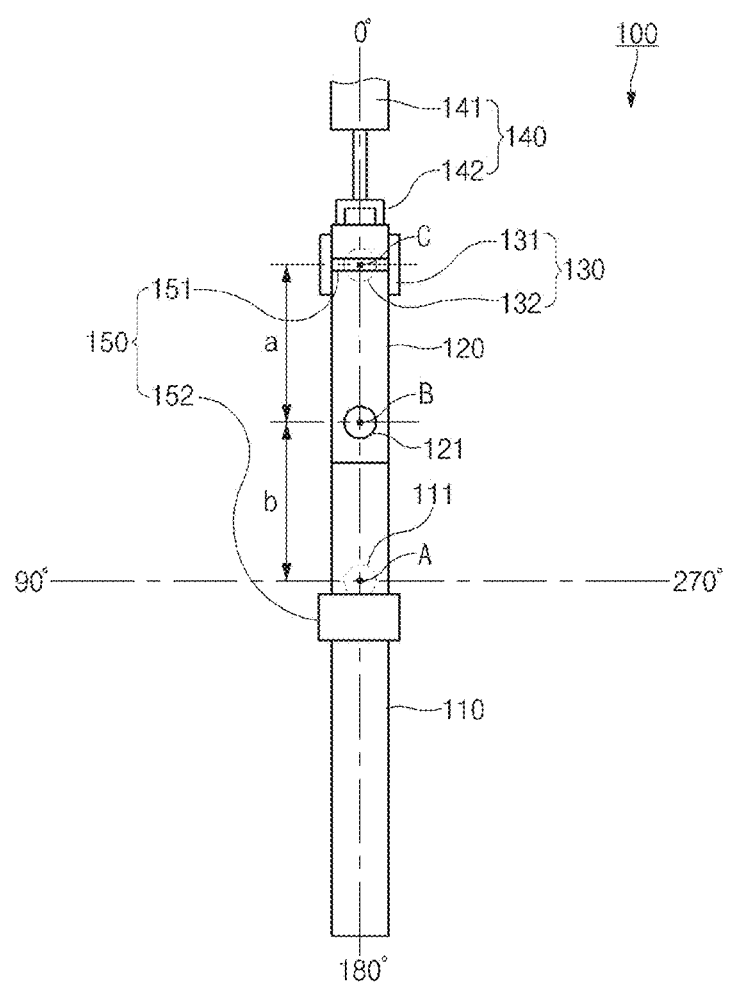

TRANSMISSION

TECHNICAL FIELD

The present invention relates to a transmission, and more particularly, to a transmission that is capable of changing a speed without using a gear.

BACKGROUND ART

In general, apparatuses using power such as machine tools or vehicles do not use power transmitted from a power source as it is, but change a speed and torque of inputted power by using a transmission so as to obtain a necessary speed and torque.

The transmission increases or decreases the number of revolution of an input shaft at an output shaft by coupling gears having different diameters and gear ratios to each other to induce a gear shift.

However, since the gear shift is realized by the coupling the gears to each other in the transmission according to the related art, noises and abrasion due to friction may occur. Particularly, the transmission has a large size and occupies a large space to deteriorate efficiency of power transmission.

DISCLOSURE OF THE INVENTION

Technical Problem

To solve the foregoing limitations, an object of the prevent invention is to provide a transmission that is simplified in structure to improve efficiency in installation and power transmission.

Technical Solution

According to an aspect of the present invention, there is provided a transmission including: an input member on which an input shaft is disposed on a bottom surface thereof, the input member rotating about the input shaft; an output member disposed above the input member and on which an output shaft is disposed on a top surface thereof, the output member rotating about the output shaft by rotational force transmitted from the input member; and a transmission member including a rotation shaft having one end movably coupled to one side of the input member in a longitudinal direction of the input member and the other end free-rotatably coupled to the other end of the output member, wherein the transmission member moves in a longitudinal direction of the input member to adjust a line b connecting an input central line (A) to an output central line (B) of the output shaft and a line a connecting a rotating central line (C) of the rotation shaft to the output central line (B) of the output shaft so that the lines a and b have the same length or lengths different from each other, thereby changing the rotational force of the input member to transmit the changed rotational force to the output member or transmitting the rotational force to the output member as it is.

When the lines a and b have the same length, the input member and the output member may have a rotation ratio of 1:2.

When the lines a and b have the lengths different from each other, the input member and the output member may have a rotation ratio of 1:1. That is, when the line a has a length greater than that of the line b, the input member and the output member may have a rotation ratio of 1:1.

The transmission may further include an operation member for moving the transmission member in the longitudinal direction of the input member.

The operation member may move the transmission member to adjust the lines a and b when the input member and the output member are disposed parallel to each other, and the rotating central line (C), the output central line (B), and the input central line (A) are successively disposed on the same horizontal line.

A support member supporting the rotation shaft so that the rotation shaft does not rotate by being interlocked with the input shaft when the rotating central line (C) of the rotation shaft and the input central line (A) of the input shaft are disposed on the same vertical line may be disposed on the input shaft of the input member.

The support member may include a support protrusion disposed on a top surface of the rotation shaft and a support and supporting a side surface of the support protrusion to prevent the rotation shaft from rotating when the rotating central line (C) of the rotation shaft and the input central line (A) of the input shaft are disposed on the same vertical line.

The output member may have a length that is equal to or less than a quarter of that of the input member.

Advantageous Effects

The transmission according to the present invention may change the rotating speed without using the gear and also be simplified in structure so as to be easily installed and improved in efficiency of the power transmission.

BRIEF DESCRIPTION OF THE DRAWINGS

FIGS. 4 and 5 are views illustrating an operation state of the transmission according to the present invention, wherein FIGS. 4A to 4D are views illustrating an operation state when a rotation ratio of an input member to an output member is 1:2.

MODE FOR CARRYING OUT THE INVENTION

Figure 1:
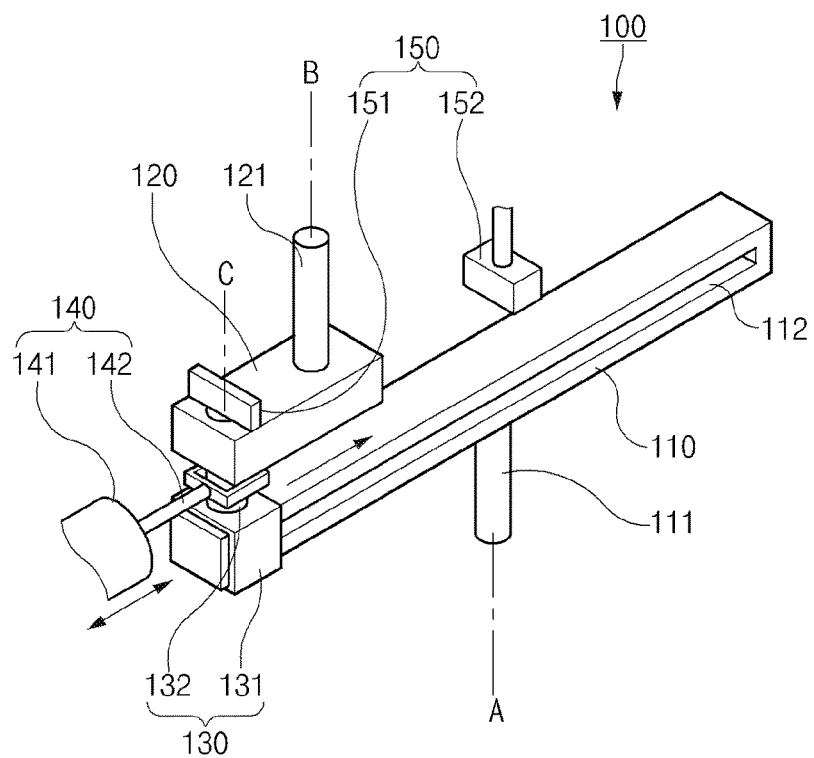
FIG. 1 is a perspective view of a transmission according to the present invention.

Hereinafter, preferred embodiments of the present invention will be described in detail with reference to the accompanying drawings in such a manner that the technical idea of the present invention may easily be carried out by a person with ordinary skill in the art to which the invention pertains. The present disclosure may, however, be embodied in different forms and should not be construed as limited to the embodiments set forth herein. In the drawings, anything unnecessary for describing the present disclosure will be omitted for clarity, and also like reference numerals in the drawings denote like elements.

A transmission according to the present invention includes an input member having a long bar shape and provides rotational force, an output member having a bar shape and rotating by the input member, a transmission member connecting the input member to the output member and varying in position thereof connected to the input member to change the rotational force transmitted from the input member to the output member. Thus, the transmission may change the rotational force without using a gear.

Hereinafter, the transmission according to an embodiment of the present invention will be described with reference to the drawings.

Figure 2:
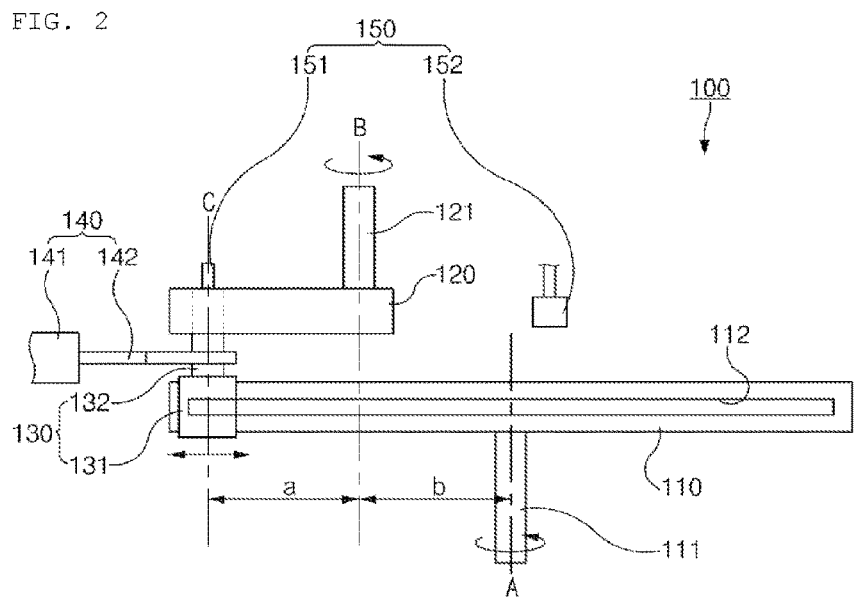
FIG. 2 is a side view of the transmission according to the present invention.
Figure 3:
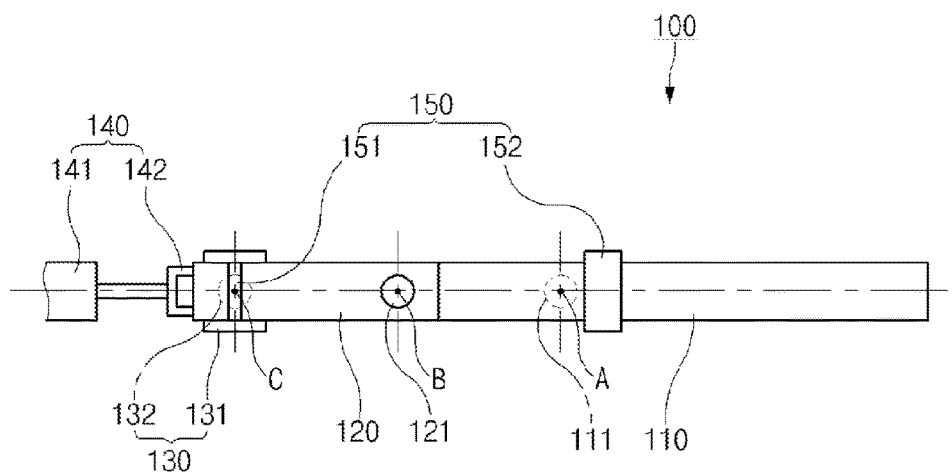
FIG. 3 is a plan view of the transmission according to the present invention.

As illustrated in FIGS. 1 to 3, a transmission 100 according to the present invention includes an input member 110 generating rotational force, an output member 120 rotating by the rotational force transmitted from the input member 110, a transmission member 130 changing the rotational force of the input member 110 to transmit the changed rotational force to the output member 120 or transmitting the rotational force of the input member 110 at it is to the output member 120, and an operation member 140 controlling the transmission member 130 to allow the transmission member 130 to change the rotational force.

The input member 110 has a long bar shape, and an input shaft 111 is disposed at a center of a bottom surface of the input member 110. That is, the input member 110 rotates about the input shaft 111 having an input central line A.

Also, a guide groove 112 to which the transmission member 130 is slidably coupled is defined in a side surface of the input member 110. Here, the guide groove 112 is defined in a longitudinal direction of the input member 110.

The output member 120 rotates by the rotational force transmitted from the input member 110. The output member 120 is disposed above the input member 110, and an output shaft 121 is disposed on one side of a top surface of the output member 120. That is, when the rotational force is transmitted from the input member 110, the output member 120 rotates about the output shaft 121 having an output central line B.

The output member 120 may have a length that is equal to or less than a quarter of that of the input member 110. That is, if the output member 120 has a length greater than the quarter of that of the input member 110, since a rotating central line C of the transmission member 130 and an input central line A of the input member 110 are not disposed on the same vertical line, the change of the rotational force may not occur. The constituents for the change of the rotational force will be described below in detail, and thus, their detailed descriptions will be omitted herein.

The transmission member 130 is disposed between the input member 110 and the output member 120 and has a structure that changes the rotational force of the input member 110 to transmit the changed rotational force to the output member 120 or transmits the rotational force of the input member 110 to the output member 120 as it is.

That is, the transmission member 130 includes a transmission part 131 that is slidably coupled to the guide groove 112 defined in the other end of the input member 110 and moves together with the input member 110 and a rotation shaft 132 that is rotatably coupled to the rotating central line C of the other end of the output member 120 and rotates the output member 120 while revolving about the output shaft 122 when the transmission part 131 rotates.

Here, referring to FIG. 1, the input central line A of the input shaft 111, the output central line B of the output shaft 121, and the rotating central line C of the rotation shaft 132 are defined on the same extension line. Thus, when the input member 110, the output member 120, and the transmission member 132 rotate, mutual interference of the input member 110, the output member 120, and the transmission member 132 may be prevented, and more stable and accurate rotation force may be obtained.

Referring to FIGS. 2 and 3, the input member 110 and the output member 120 rotates parallel to each other. When the rotating central line C, the output central line B, and the input central line A are successively defined on the same horizontal line, the change of the rotational force may occur because a length of a line b that is perpendicularly connected from the input central line A to the output central line B and a length of a line a that is perpendicularly connected from the rotating central line C to the output central line B are the same or different from each other.

That is, the transmission member 130 includes a transmission part 131 that is slidably coupled to the guide groove 112 defined in the other end of the input member 110 and moves together with the input member 110 and a rotation shaft 132 that is rotatably coupled to the rotating central line C of the other end of the output member 120 and rotates the output member 120 while revolving about the output shaft 121 when the transmission part 131 rotates.

In more detail, when the transmission member 130 coupled to the one side of the input member 110 is adjusted in position so that the line b and the line a have the same length, a rotation ratio of the input member 110 to the output member 120 becomes 1:2 (see FIGS. 4A to 4D). Also, when the transmission member 130 coupled to the one side of the input member 110 is adjusted in position so that the line a and the line b have lengths different from each other, i.e., when the line a has a length greater than that of the line b, a rotation ratio of the input member 110 to the output member 120 becomes 1:1 (see FIGS. 5A to 5D).

Here, if the output member 120 has a length that is greater than a quarter of that of the input member 110, it may be impossible to adjust the lengths of the lines a and b so that the lines a and b have the same length. Thus, the change of the rotational force may not occur. As a result, the output member 120 may have a length less than the quarter of that of the input member 110.

An operation of the transmission will be described below in detail, and thus, detailed descriptions thereof will be omitted herein.

The operation member 140 may push or pull the transmission member 130 in a longitudinal direction of the input member 110 to adjust the lengths of the lines a and b so that the lines a and b have lengths equal to or different from each other. That is, the operation member 140 includes a cylinder 141 and an operation piece 142 having one end connected to a piston rod of the cylinder 141 and the other end connected to the rotation shaft 132 to adjust a position of the transmission part 131 coupled to the input member 110 while pushing or pulling the rotation shaft 132 by the operation of the cylinder 141.

Here, the operation piece 142 is coupled to surround the transmission part 131 so that the operation piece 142 does not interfere with the transmission part 131 when the transmission part 131 rotates.

When the lines a and b have the same length, the input member 110 may rotate at an angle of about 90°, and simultaneously, the output member 120 may rotate at an angle of about 180° by the transmission member 130. Here, the input central line A of the input member 110 and the rotating central line C of the transmission member 130 are disposed on the same vertical line, and thus, the rotation shaft 132 of the transmission member 130 may rotate on the spot along the input shaft 111.

To solve the foregoing limitation, the transmission 100 according to the present invention includes a support member 150 supporting the input shaft 111 to prevent the input shaft 111 from rotating when the input central line A of the input member 110 and the rotating central line C of the transmission member 130 are disposed on the same vertical line. Thus, the transmission member may rotate the output member 120 while moving along the input member 110 by the support member 150 to previously prevent an operation error from occurring.

That is, the support member 150 includes a support protrusion 151 disposed on an upper portion of the rotation shaft 132 and a support 152 disposed approximately on the input central line A of the input member 110 to support the rotation shaft 132.

Here, although the support 152 has a bar shape, the present invention is not limited thereto. For example, the support 152 may have various shapes such as a roller shape and a curved shape as occasion demands.

When the input central line A and the rotating central line C are disposed on the same line, since the support protrusion 151 and the support 152 are supported, the support member 150 may prevent the rotation shaft 132 from rotating along the input shaft as it is. Thus, the rotation shaft 132 rotates the output member 120 while pressing the output member 120. That is, when the lines a and b have lengths that are equal to or different from each other, the change of the rotational force may occur.

An operation state of the transmission including the above-described constituents according to the present invention will be described with reference to the accompanying drawings.

[When the Lines a and b have the Same Length]

As illustrated in FIG. 4A, when the rotating central line C, the output central line B, and the input central line A are successively disposed on the same horizontal line, i.e., when being located at an angle of about 0° in FIG. 4A, the transmission member 130 moves through the operation member 140 to adjust the lines a and b so that the lines a and b have the same length.

Figure 4B:
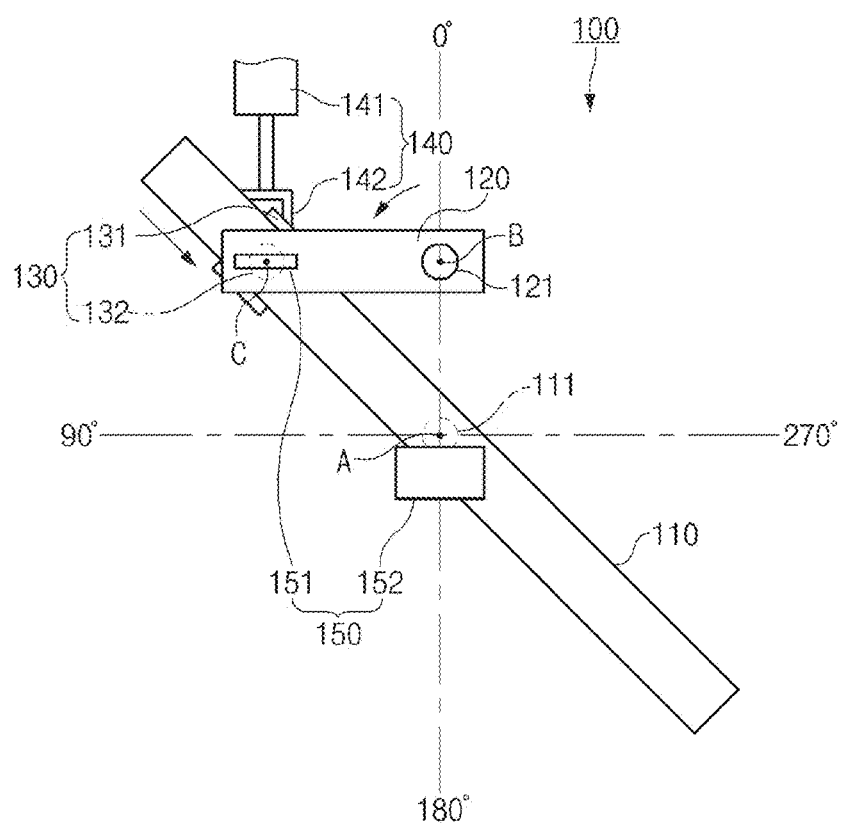

In this state, as illustrated in FIG. 4B, when the input member 110 rotates at an angle of about 45° with respect to the input shaft 111, the transmission part 131 of the transmission member 130 rotates along the input member 110. Here, since the transmission part 131 is fixed to the rotation shaft 132, and the rotation shaft 132 is coupled to the output member 120, the transmission member 130 rotates the output member 120 with respect to the output shaft 121 while moving, and the transmission part 131 moves along the guide groove 112 of the input member 110. That is, the output member 120 rotates an angle of about 90°.

Thus, the input member 110 rotates an angle of about 45°, and the output member rotates an angle of about 90°.

Figure 4C:
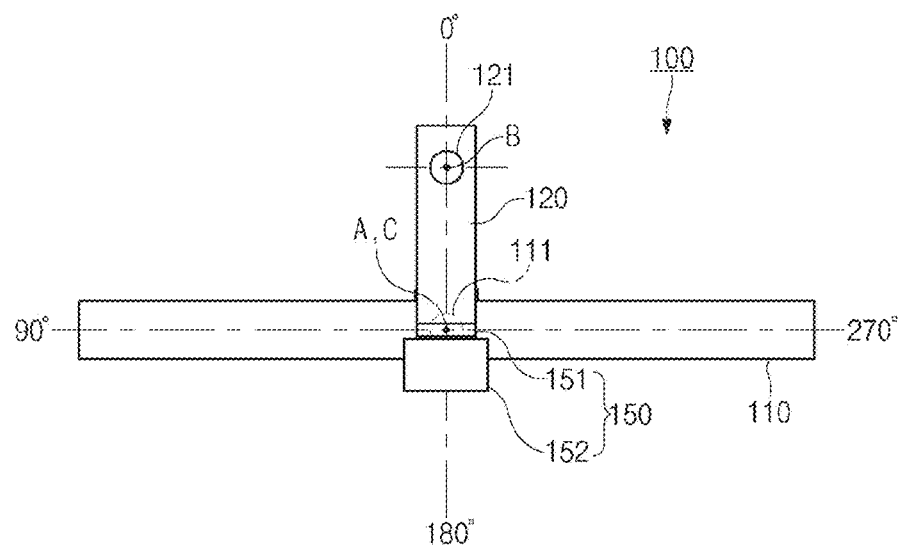

In this state, as illustrated in FIG. 4C, when the input member 110 rotates at an angle of about 90° with respect to the input shaft 111, the transmission member 130 moves by the input member 110, and the output member 120 rotates about the output shaft 121 by the transmission member 130. Here, the transmission part 131 is disposed on the input shaft 111 of the input member 110 while moving along the guide groove 112 of the input member 110, and thus, the output member 120 rotates at an angle of about 180°.

Here, since the input central line A of the input member 110 and the rotating central line C of the transmission member 130 are disposed on the same vertical line, the support protrusion 151 disposed on the rotation shaft 132 is supported by the support 152 to prevent the rotation shaft 132 from rotating along the input shaft 111 as it is.

Figure 4D:
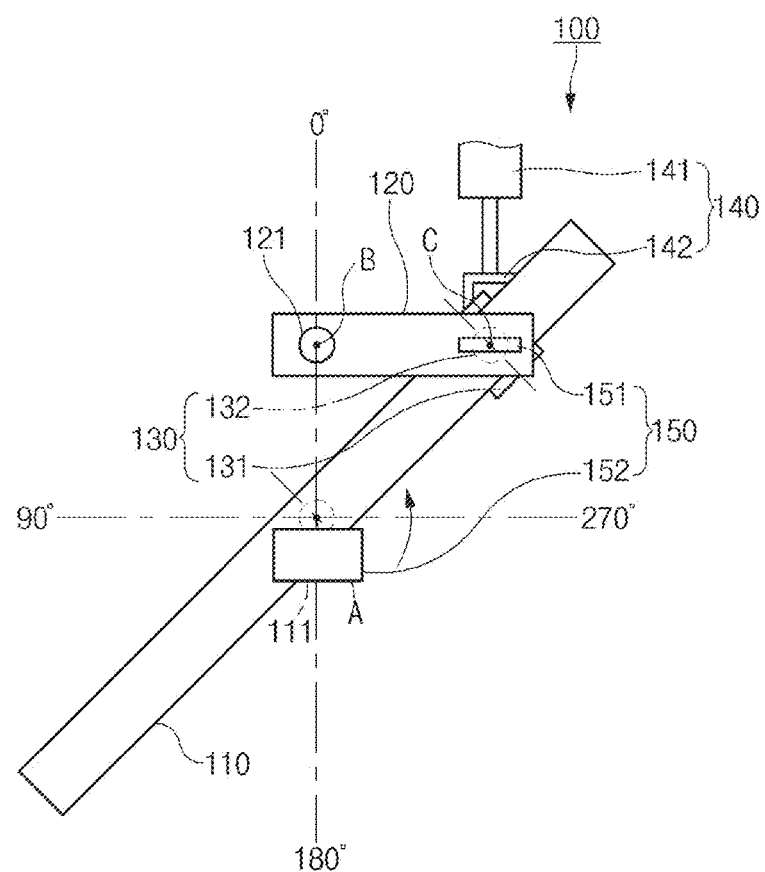

In this state, as illustrated in FIG. 4D, when the input member 110 rotates at an angle of about 135° with respect to the input shaft 111, the transmission member 130 moves by the input member 110, and the output member 120 rotates about the output shaft 121 by the movement of the transmission member 130. Here, while the transmission part 131 moves along the guide groove 112 of the input member 110, the output member 120 rotates at an angle of about 270°.

In this state, as illustrated in FIG. 4A, when the input member 110 rotates at an angle of about 180° with respect to the input shaft 111, each of the transmission member 130 and the output member 120 returns to it original position. That is, the output member 120 rotates an angle of about 360°.

Thus, when the lines a and b have the same length, the input member 110 and the output member 120 have a rotation ratio of 1:2, and the rotational force transmitted from the input member 110 to the output member 120 may be changed.

[When Lines a and b have Lengths Different from Each Other]

Figure 5A:
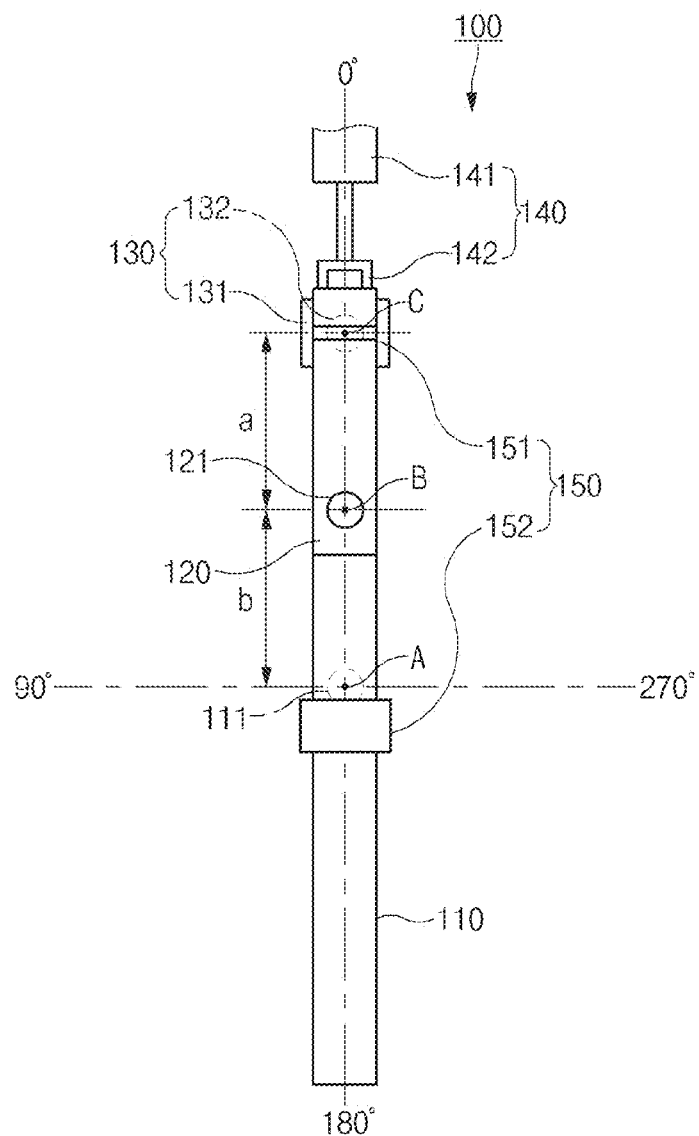
FIGS. 5A to 5D are views illustrating an operation state when a rotation ratio of the input member to the output member is 1:1.

As illustrated in FIG. 5A, when the rotating central line C, the output central line B, and the input central line A are successively disposed on the same horizontal line, i.e., when being located at an angle of 0° in FIG. 5A, the transmission member 130 moves through the operation member 140 to adjust the lines a and b so that the lines a and b have lengths different from each other. In the present invention, the structure in which the line a has a length greater than that of the line b will be described as an example.

Figure 5B:
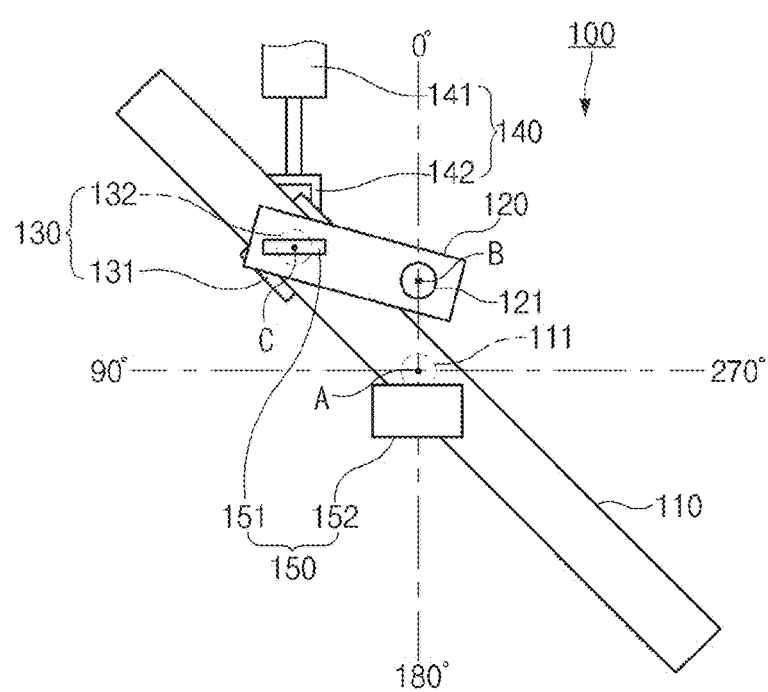

In this state, as illustrated in FIG. 5B, when the input member 110 rotates at an angle of about 45° with respect to the input shaft 111, the transmission part 131 of the transmission member 130 rotates by the input member 110. Here, since the transmission part 131 is fixed to the rotation shaft 132, and the rotation shaft 132 is coupled to the output member 120, the output member 120 rotates about the output shaft 121 along the transmission part 131. Here, the transmission part 131 moves along the guide groove 112 of the input member 110, and the output member 120 rotates at an angle of about 90°.

Figure 5C:
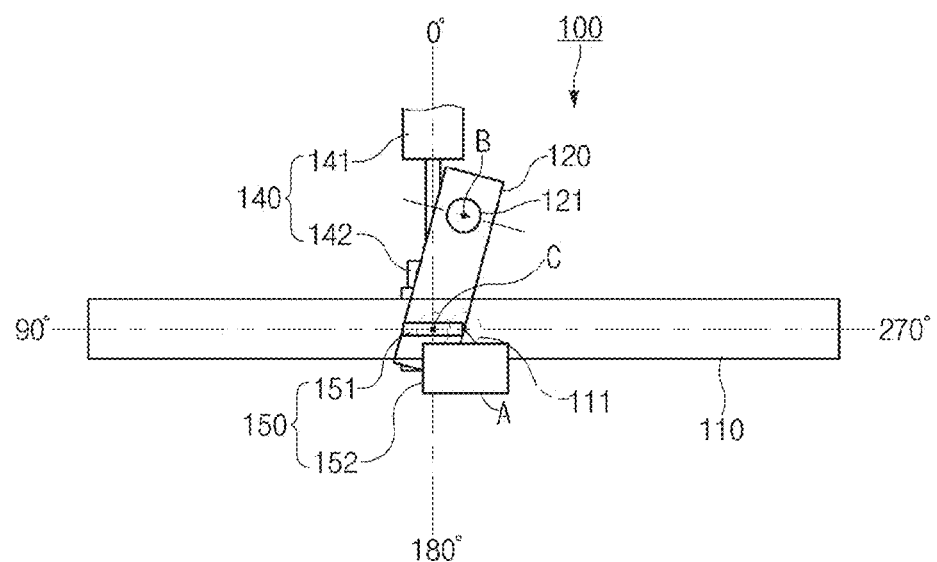

In this state, as illustrated in FIG. 5C, when the input member 110 rotates at an angle of about 90° with respect to the input shaft 111, the transmission member 130 moves by the input member 110, and the output member 120 rotates about the output shaft 121 by the movement of the transmission member 130. Here, the transmission part 131 rotates the output member 120 at an angle of about 90° to about 180° while moving along the guide groove 112 of the input member 110.

Figure 5D:
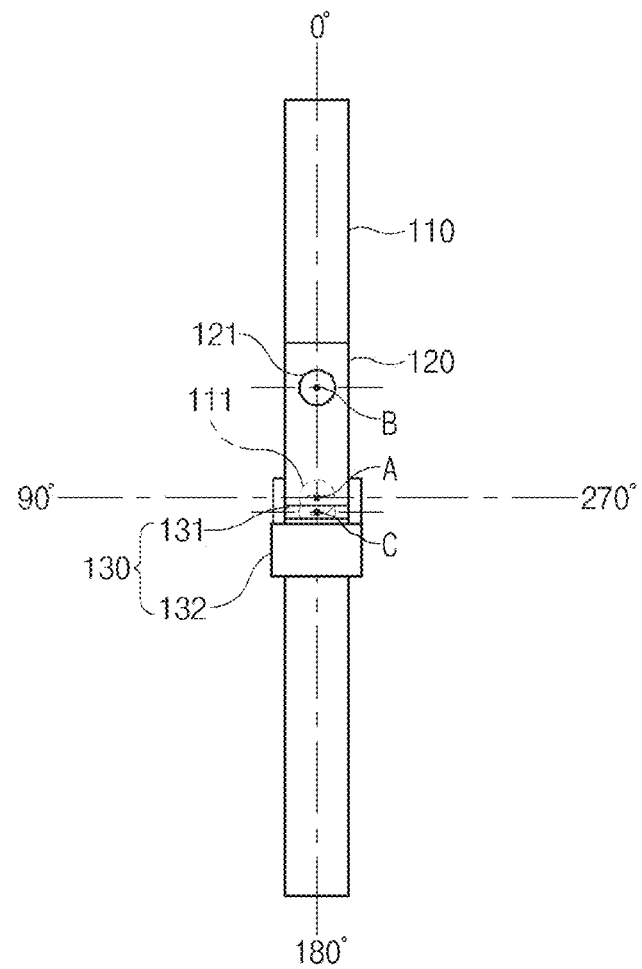

In this state, as illustrated in FIG. 5D, when rotating at an angle of about 180° with respect to the input shaft 111 of the input member 110, the input member 110 rotates at an about of 180° together with the input shaft 111, and the transmission part 131 of the transmission member 130 rotates by the input member 110. Here, the transmission part 131 rotates the output member 120 while moving along the guide groove 112 of the input member 110. That is, the input member 110 and the output member 120 may rotate at the same angle, i.e., about 180°. Thus, the input member 110 and the output member 120 may have a rotation ratio of 1:1. Here, the input central line A of the input member 110 and the rotating central line C of the transmission member 130 are disposed on positions different from each other. In this state, when the input member 110 rotates, the transmission member 130 rotates the output member 120 while moving. That is, the transmission member 130 may rotate without being supported by the support member 140.

In this state, as illustrated in FIG. 5A, when rotating at an angle of about 360° with respect to the input member 111 of the input member 110, the transmission member 130 rotates at an angle of about 360° by the input member 110, and the output member 120 rotates at an angle of about 360° by the transmission member 130.

Thus, when the lines a and b have the lengths different from each other, the input member 110 and the output member 120 may have the rotation ratio of 1:1, and the rotational force of the input member 110 may be transmitted to the output member 120 as it is without changing the rotational force.

In the transmission, which operates as described above, according to the present invention, the change of the rotational force may be realized by using the output member and the transmission member. Thus, the structure of the transmission may be simplified to reduce the manufacturing costs.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A transmission comprising:
an input member on which an input shaft is disposed on a bottom surface thereof, the input member rotating about the input shaft, wherein the input shaft defines an input central line (A);
an output member disposed above the input member and on which an output shaft is disposed on a top surface thereof, the output member rotating about the output shaft by rotational force transmitted from the input member, wherein the output shaft defines an output central line (B);
a transmission member comprising a rotation shaft having one end movably coupled to one side of the input member in a longitudinal direction of the input member and the other end free-rotatably coupled to the output member, wherein the rotation shaft defines a rotating central line (C),
wherein the transmission member moves in the longitudinal direction of the input member to adjust a length of a line b connecting the input central line (A) to the output central line (B) of the output shaft to be same as or different from a length of a line a connecting the rotating central line (C) of the rotation shaft to the output central line (B) of the output shaft, so as to change revolutions of the output member per one rotation of the input member,
wherein the transmission further comprises a support member supporting the rotation shaft so that the rotation shaft does not rotate by being interlocked with the input shaft when the rotating central line (C) of the rotation shaft and the input central line (A) of the input shaft are disposed on the same vertical line,
wherein the support member comprises:
a support protrusion disposed on a top surface of the rotation shaft; and
a support disposed approximately on the input central line (A) so that a side surface of the support protrusion can be supported by the support when the rotating central line (C) of the rotation shaft and the input central line (A) of the input shaft are disposed on the same vertical line, which prevents the rotation shaft from rotating along the input shaft,
wherein the output member has a length that is equal to or less than a quarter of that of the input member.

2. The transmission of claim 1, wherein, when the lines a and b have the same length, the input member and the output member have a rotation ratio of 1:2.

3. The transmission of claim 1, further comprising an operation member for moving the transmission member.

4. The transmission of claim 3, wherein the operation member moves the transmission member to adjust the length of the line b when the input member and the output member are disposed parallel to each other, and the rotating central line (C), the output central line (B), and the input central line (A) are successively disposed on the same horizontal line.

* * * * *